INVENTORS
Shozo Sekino
Yukito Sasaki
BY Osamu Araki

INVENTORS
Shozo Sekino
Yukito Sasaki
BY Osamu Araki

United States Patent Office 3,560,123
Patented Feb. 2, 1971

3,560,123
**METHOD AND APPARATUS FOR AUTOMATI-
CALLY SHEARING METAL PLATES BY SUPER-
SONIC FLAW DETECTION**
Shozo Sekino, Osamu Araki, and Yukito Sasaki, Kitakyu-
shu, Japan, assignors to Yawata Iron & Steel Co., Ltd.,
and Mitsubishi Electric Corporation, Tokyo, Japan
Filed July 3, 1968, Ser. No. 742,247
Claims priority, application Japan, July 6, 1967,
42/43,489
Int. Cl. B26d 5/00
U.S. Cl. 83—13                              3 Claims

ABSTRACT OF THE DISCLOSURE

A method and apparatus for automatically shearing metal plates by supersonic flaw detection, wherein the location of flaw present in a metal plate as hot-rolled and still in the state of high temperature is detected by means of supersonic flaw detection, whereby the distance of this flaw and that of the good material part from a standard position are measured, the measured values are sent to a computer to determine the optimum shearing position and an instruction is given from the computer to a shearing machine so that a planned shearing may be carried out.

BACKGROUND OF THE INVENTION

Field of invention

The present invention relates to a method and apparatus for automatically shearing metal plates by supersonic flaw detection, wherein the location of flaw present in a metal plate as hot-rolled and still in the state of high temperature is detected by means of supersonic flaw detection, whereby the distance of this flaw and that of the good material from a standard position are measured, the measured values are sent to a computer to determine the optimum shearing position, and from the computer an instruction is issued for actuating a shearing machine interlocked therewith so that a planned shearing may be carried out.

DESCRIPTION OF PRIOR ART

Generally, when producing a steel plate, it is usual that at first a slab of predetermined dimensions is made by cutting a steel ingot as hot-rolled to be of intermediate dimensions. The ingot is then hot-rolled to be a steel plate of determined dimensions. However, the cut lengths of the slabs in the slabbing mill are determined by a worker by judging with the naked eye the cut surface of the slab to judge whether there are flaws or laminations or not, without adopting any non-destructive test. It is clear that such an operation is very inefficient, and that often the loss of yield caused by excessive cutting is so large that this operation is not desirable.

SUMMARY OF THE INVENTION

In view of the fact as above-mentioned, it is keenly required to make the optimum cutting in the stage of preparing slabs in order to minimize the cost of steel plate production. The cutting of slab has, in general, following objects:

(a) To cut off fold flaws in the front and rear end parts of a slab as produced during the rolling or shrinkage holes in the head part of a steel ingot produced during solidification, and (b) To divide the good material part to dimensions corresponding to ordered dimensions of a product or dimensions as defined by the operating capacity of the sequent step.

As is understood from the foregoing, it is quite necessary to effect the optimum cutting by applying any nondestructive test to a slab to be cut, whereby the distribution of flaws in the slab is to be detected, the length of the good material part is to be correctly measured and the optimum cutting dimensions are to be determined on the basis of the said measured. However, as above-mentioned, it is the real situation of today that neither the length of the flaw present in the slab nor the length of the good material part can correctly be detected, when cutting the slab, because the cutting of the slab is performed depending upon the observation of the section of a slab made by a worker with the naked eye, without respect to the nondestructive testing method. Therefore, it is usual that on account of an incorrectness and personal difference in the observation with the naked eye, trial cuts of two to four times on the average must be made until the flaw may be eliminated. This results not only in the reduction of the cutting efficiency but also in the loss of the plate caused by the excessive cutting. Further, it is noted that as the good material part is divided by cutting in turn to predetermined dimensions, it occurs often that the final slab will be short of the predetermined dimensions, and such a short slab must be cast away at a great loss as scrap.

In view of these facts it is an object of the present invention to correctly detect the tip location of any flaw by applying a supersonic flaw detection to a slab of a high temperature and automatically cut off the flaw by communicating the detected location thereof to a shearing machine. More in detail, the present invention is characterized by detecting the location of any flaw in the front and rear end part of a metal plate and the distance of the detected flaw from a standard position by applying a supersonic flaw detection to the metal plate, determining the position of the metal plate, at which it is to be sheared, by introducing the detected values into a computer, in which various conditions are set in advance, from which an instruction is given to a shearing machine inn accordance with the said determination of the shearing position.

DESCRIPTION OF THE PREFERRED EMBODIMENT

Figure 1:
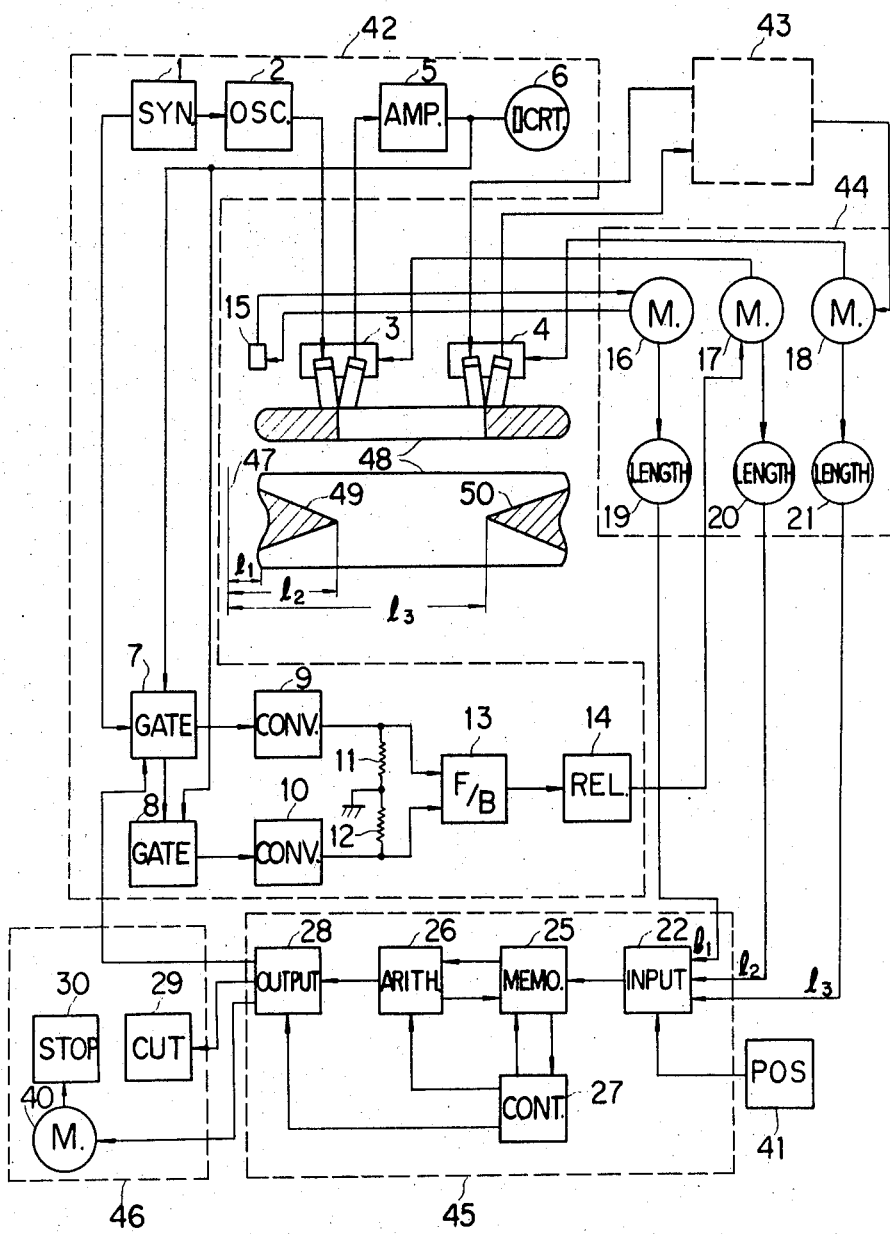
FIG. 1 is an operation block diagram showing an embodiment of the present invention.

The present invention shall be concretely explained in the following with reference to an embodiment shown in the drawings.

First of all, in FIG. 1, apparatus parts 42 and 43 enclosed with broken lines are respectively supersonic flaw detecting apparatus. Element 44 comprises driving motors 16, 17 and 18 and corresponding length meters 19, 20 and 21, wherein 16 is a motor for controlling an apparatus 15 for detecting the position of the end of a material to be examined, such as, for instance a slab, and 17 and 18 are motors for controlling the operation of supersonic probes 3 and 4 respectively. These motors are controlled by the results of the inspection operation so that the probes 3 and 4 stop at the tips of the flaws. Element 45 is an electronic computer. Element 46 is a shearing apparatus. When slab 48 is at a standstill in a fixed position, the supersonic flaw detecting apparatus is arranged to move thereover.

Figure 2:
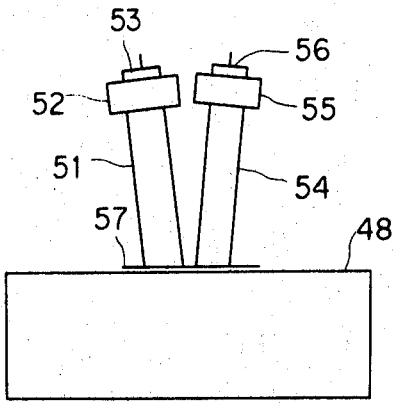
FIG. 2 is a side view showing the detailed structure of the probe shown in FIG. 1 and a method of bringing the same in contact with a material to be examined.
Figure 3:
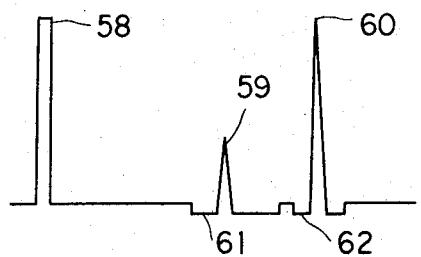
FIG. 3 shows pulses appearing on the screen of the Braun tube in FIG. 1 where a flaw is detected with the probe in FIG. 2 and also two square pulses from gate circuits to separate and to take out each pulse.

A transmitter 2 will generate supersonic pulses in response to synchronous pulses at regular intervals generated by a synchronizing part 1. These pulses are applied to the probe 3. In the probe 3, as shown in FIG. 2, a water-cooled jacket 52 is placed in the upper part of a steel bar 51 to cool this part and a transmitting supersonic oscillator 53 is fitted to the end surface of said part and, in the same manner, a water-cooled jacket 55 and a receiving supersonic oscillator 56 are fitted to another steel bar 54. The probes are set in contact with the surface of a material to be examined by using a metallic salt which may be a mixed coupling agent 57 so that no air may be interposed between the probe and the slab. A supersonic pulse as is shown in FIG. 3, generates a train of pulses. In FIG. 3, 58 is a transmitted pulse, 59 is a flaw echo pulse and 60 is a bottom surface echo pulse.

The thus obtained pulse echoes enter an amplifier 5 whereby they are amplified. The output of amplifier 5 enters two gate circuits 7 and 8. On the other hand, to this gate circuit 7 are also applied pulses from the synchronizing part 1. However, these synchronized pulses are delayed in the gate circuit 7 by the time required for the supersonic waves to propagate through the two steel bars 51 and 54 and generate such square pulse 61, as is shown in FIG. 3. Further, as this gate circuit 7 is connected with an output apparatus 28 of the computer 45 and the thickness of the material to be examined is being previously recorded in this computer 45, an output proportioned to the thickness of the material 48 to be examined is sent to the gate circuit 7 from the output apparatus 28 of the computer 45, whereby a square pulse of a length corresponding to the thickness of the material 48 may be made. This length slightly shorter than the time required for the supersonic waves to reciprocally propagate through the thickness of the material 48 and, only during the generation of this square pulse, may the pulses from the amplifier 5 (the flaw echo pulses 59 in FIG. 3) be conducted. On the other hand, in the gate circuit 8, square pulse 61 made in the gate circuit 7 is differentiated and the later pulse of two pulses generated by the differentiation is used to generate the square pulse 62.

The length of the square pulse 62 in the gate circuit 8 may be freely determined as shown in FIG. 3 so that, only during the square pulse may the pulses from the amplifier 5 (the bottom surface echo pulses 60 in FIG. 3) be passed through.

The part 9 is a converting circuit to convert the output pulses of the gate circuit 7 to voltages which continue relatively long at the same height as of the said output pulses. Part 10 is also a converting circuit to convert the output pulses of the gate circuit 8 in the same manner. The outputs of the converting circuits 9 and 10 are fed respectively to resistances 11 and 12 and their voltages enter an $F/B$ selective circuit 13. (F represents the height of the flaw echo 59, B represents the height of the bottom surface echo 60 and the $F/B$ selective circuit is a circuit to divide the F voltage by the B voltage. As this circuit is explained in Japanese Pat. No. 737,902, its detailed explanation shall be omitted here. In short, it represents the flaw location. If $F/B=1$, that is, when the two voltages are equal, the probe is just above the flaw location.) The output of this selective circuit 13 enters a relay circuit 14 to open or close it according to the value of $F/B$. This relay circuit 14 is inserted in series with the electric source circuit of the driving motor 17 for the probe 3 so that the driving motor 17 may be controlled to rotate or stop in response to the opening and closing of said relay circuit 14. Therefore, when $F/B=1$, the relay circuit 14 is opened, stopping the motor 17. As a result, the probe 3 stops correctly just above the location of the tip of a flaw 49. The operation of the part consisting of the probe 4 and the driving motor 18 is the same as the operation of the probe 3.

The number of revolutions of the driving motors 16, 17 and 18 are respectively functions of the moving distance of the end position determining apparatus and the flaw detecting apparatus and are connected with length meters 19, 20 and 21 for measuring distances from a standard position 47. From the respective length meters, which measure respective distances of the locations of the end position of the slab and the tips of the flaws from the standard position 47, there may be obtained outputs proportional to lengths $l_1$, $l_2$ and $l_3$ as shown in FIG. 1, wherein $l_1$ indicates the distance of the forward end of the slab from the standard position 47, $l_2$ the distance of the tip of the flaw from the standard position 47 and $l_3$ the distance of the tip of a flaw at the rear part of the slab from the standard position 47. Such output will be represented in a digital quantity in case, for example, a pulse generating apparatus is used for the length meter and in an analog quantity in case a potentiometer is used. Therefore, first, the distance of the forward end of the slab from the standard position 47, that is, the length $l_1'$ is detected with the length meter 19 and the computer 45 is made to memorize it. Then, the distance $l_2$, which indicates, how far the tip of the flaw at the forward part of the slab extends from the standard position 47, is detected by the length meter 20 and the computer 45 is made to also memorize $l_2$.

The computer 45 is formed of an input apparatus 22, memorizing apparatus 25, arithmetic apparatus 26, controlling apparatus 27 and output apparatus 28, as are provided in an ordinary electronic computer. In the controlling apparatus are set such predetermined conditions as, for example, the shift of the cutting position $l$ from the tip of the flaw, or the ordered dimensions.

The outputs from the respective length meters 19, 20 and 21 and the output of a production ordering apparatus 41 enter the input apparatus 22 and are computed in the electronic computer 45 to determine the cutting dimensions and cutting method of the material 48 being examined.

The output apparatus 28 sends an output proportional to the thickness of the material 48 being examined to the gate circuit 7, a cutting instructing output to a shearing machine 29 and an output proportional to the cut length to a driving motor 40 in turn. The slab having had the location of the flaw thus detected is transferred toward the shearing machine 29.

A shearing apparatus 46 is formed of the shearing machine 29, stopper 30 and driving motor 40. The driving motor 40 is moved by an output proportional to the cutting length obtained from the output apparatus 28 so that the position of the slab, that is the cutting position, may be determined by the stopper 30. The shearing machine is operated by the cutting instruction from the output apparatus 28 so that the flaws 49 and 50 of the examined material 48 may be automatically cut off and the good material part may be divided and selected. This stopper may be set for a length of $l_2-l_1$ from the cutter edge by an electric computer so as to make the slab 48 stop just at the cutting position.

Figure 4:
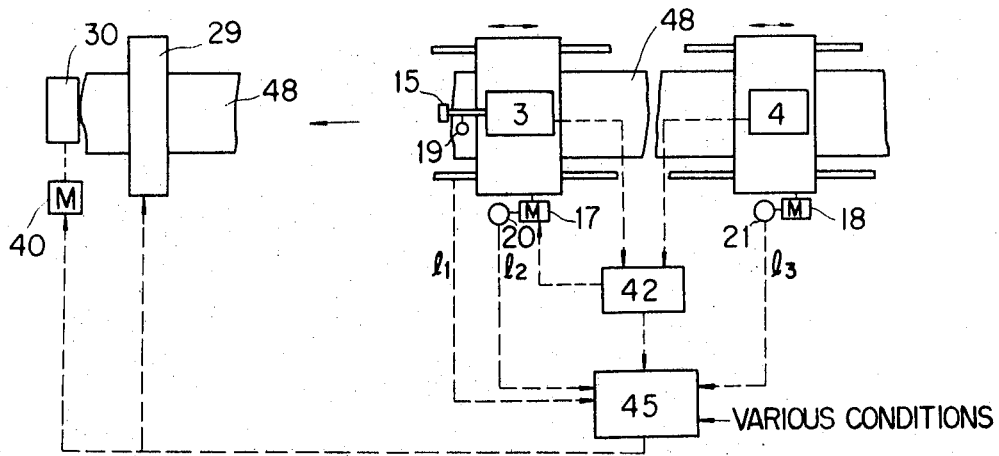
FIG. 4 is a schematic view showing an apparatus embodying the present invention.

FIG. 4 is a schematic view of an apparatus to which this method is actually applied.

The operating principle of the present invention shall be briefly explained hereinafter.

First of all, when the slab 48 is moved to just below the supersonic flaw detecting apparatus a sensor, such as for example, a thermoelectric sensor, detects the presence of the slab, sends a signal to the motor, whereby the motor and thus the slab are stopped. The flaw detecting apparatus having the probes 3 and 4 detects the location of flaws while moving on the slab 48, also detects their distances from the standard position with the length meters and sends this information to the computer 45.

An arithmetical operation is made on the basis of predetermined conditions in the computer and this value is given to the subsequent shearing machine 29 and stopper 30.

Then, the slab is moved toward the shearing machine 29 so that the position of the shearing machine 29 may be made to coincide with the location of the flaw in the slab by the stopper 30 and is shown.

Thus, the automatic shearing method of the present invention is so simple to make correct shearing that the following effects can be obtained:

(1) The shearing yield of the slab increases.

(2) Flaws may be removed from the slab by a single shearing operation, and the shearing efficiency is more than tripled. Therefore, the life of the shearing apparatus may be greatly elongated.

(3) Excess rolling due to the excess thickness of the slab may be eliminated and the load on the rolling in the sequent step will be reduced.

(4) It becomes possible to adjust the ordered dimensions and the slab length.

Thus, in the long run the method of the present invention is very economic, as the production of defective plates may be largely reduced.

Though the present invention has been explained in the above with an example, in which the supersonic flaw detecting apparatus moves above the slab, the subject matter of the present invention is not limited thereto. The same principle can be applied also to the reverse case that the slab moves below the flaw detecting apparatus. In such case, the motors 17 and 18 of the driving apparatus 44 may be made driving motors for slab moving rolls.

What we claim is:

1. A method for automatically shearing metal plates by supersonic flaw detection, comprising the steps of detecting the location of any flaw in the front or rear end part of a metal plate and the distance of said flaw from a standard position by moving a supersonic flaw detection device over said metal plate, determining the shearing position by putting these detected values into a computer, in which determined conditions are set in advance, and giving this instruction to a shearing machine.

2. An apparatus for automatically shearing metal plates by supersonic flaw detection comprising a supersonic flaw detecting apparatus for detecting flaws in metal plates, length meters for measuring distances of the flaw locations from a standard position and circuits for putting the detected values into a computer, in which determined conditions are set, a circuit for giving signals from said computer to a shearing apparatus being interlocked with the computer.

3. An apparatus for automatically shearing metal plates by supersonic flaw detection according to claim 2 characterized in that said supersonic flaw detecting apparatus is made to sweep on the slab in the flaw detecting position of the metal plate.

References Cited
UNITED STATES PATENTS

| | | | |
|---|---|---|---|
| 445,860 | 2/1891 | DePlace | 73—69 |
| 1,990,085 | 2/1935 | Mudge et al. | 73—69X |
| 2,309,343 | 1/1943 | Farrow | 83—371X |
| 3,173,291 | 3/1965 | Simjian | 73—69X |
| 3,191,857 | 6/1965 | Galey et al. | 83—371X |
| 3,264,916 | 8/1966 | Owen | 83—371X |

JAMES M. MEISTER, Primary Examiner

U.S. Cl. X.R.

83—71, 364, 371, 522